(12) United States Patent
Ebersole, Jr. et al.

(10) Patent No.: US 6,616,454 B2
(45) Date of Patent: Sep. 9, 2003

(54) METHOD OF SIMULATING NOZZLE SPRAY INTERACTION WITH FIRE, SMOKE AND OTHER AEROSOLS AND GASES

(75) Inventors: John Franklin Ebersole, Jr., Bedford, NH (US); Todd Joseph Furlong, Goffstown, NH (US)

(73) Assignee: Information Decision Technologies, LLC, Bedford, NH (US)

( * ) Notice: Subject to any disclaimer, the term of this patent is extended or adjusted under 35 U.S.C. 154(b) by 0 days.

(21) Appl. No.: 09/805,956

(22) Filed: Mar. 14, 2001

(65) Prior Publication Data

US 2002/0160343 A1 Oct. 31, 2002

Related U.S. Application Data

(60) Provisional application No. 60/189,548, filed on Mar. 15, 2000.

(51) Int. Cl.[7] .................................................. G09B 9/00
(52) U.S. Cl. ...................................................... 434/226
(58) Field of Search .................................. 434/118, 219, 434/266, 307 R, 308, 365; 345/8; 703/5, 6; 709/201; 62/640; 169/45, 61, 74, 89; 340/628, 629; 250/330, 332, 339.04, 574; 244/134 R

(56) References Cited

U.S. PATENT DOCUMENTS

| | | | | |
|---|---|---|---|---|
| 5,059,124 A | * | 10/1991 | Tsujita ........................ | 434/226 |
| 5,181,851 A | * | 1/1993 | Layton et al. .............. | 434/226 |
| 5,660,549 A | * | 8/1997 | Witt, III ..................... | 434/226 |
| 5,920,492 A | * | 7/1999 | Montag et al. ................ | 703/6 |
| 6,129,552 A | * | 10/2000 | Deshoux et al. ........... | 434/226 |
| 6,255,650 B1 | * | 7/2001 | Warner et al. .............. | 250/330 |
| 6,267,788 B1 | * | 7/2001 | Andersson ................... | 169/74 |
| 6,360,992 B1 | * | 3/2002 | Stanko et al. ........... | 244/134 R |
| 6,401,487 B1 | * | 6/2002 | Kotliar ........................ | 62/640 |
| 2002/0010734 A1 | * | 1/2002 | Ebersole et al. ............ | 709/201 |

* cited by examiner

*Primary Examiner*—Joe H. Cheng
(74) *Attorney, Agent, or Firm*—Brian M. Dingman, Esq.; Mirick, O'Connell, DeMallie & Lougee, LLP

(57) ABSTRACT

A method is presented for calculating a force to apply to components in a computer simulation to simulate the effect that an extinguishing agent stream (e.g., water or foam from a nozzle) should have on airflow in the vicinity of the stream, thereby affecting the movement of other components of the simulation. The method is designed to work in real-time as part of a virtual reality, augmented reality, or other real-time 3-D graphics simulation. In addition to the preferred embodiment of calculating forces to apply to a fire and smoke plume, the invention also contemplates calculation of a force to apply to aerosols and particles that are not part of a fire and smoke plume.

22 Claims, 2 Drawing Sheets

METHOD OF SIMULATING NOZZLE SPRAY INTERACTION WITH FIRE, SMOKE AND OTHER AEROSOLS AND GASES

CROSS REFERENCE TO RELATED APPLICATIONS

This application claims priority of pending Provisional patent application No. 60/189,548 filed Mar. 15, 2000.

This application is related to pending patent application Ser. No. 09/525,983 filed Mar. 13, 2000.

This invention was made with Government support under Contract Number N61339-98-C-0036 awarded by the Department of the Navy. The Government has certain rights in the invention.

FIELD OF THE INVENTION

This invention relates to simulating use of nozzle spray to combat hazardous conditions in emergency situations, such as when performing firefighting, with real-time computer graphics, including the use of particle systems.

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

In a simulation, flow from a nozzle should affect airflow in an environment and cause motion of aerosols and gases to be affected. In the preferred embodiment of this invention, a firefighter training simulation, extinguishing agent flow from a nozzle should affect the path of a fire and smoke plume. This invention simulates such an effect with considerably less computational cost than a computational fluid dynamics (CFD) simulation, allowing for real-time simulation. This invention also applies to graphical components other than fire and smoke, including ambient steam, ambient smoke, visible fumes, invisible fumes, and other aerosols, gases, and particulate matter.

DETAILED DESCRIPTION OF THE INVENTION

Figure 1:
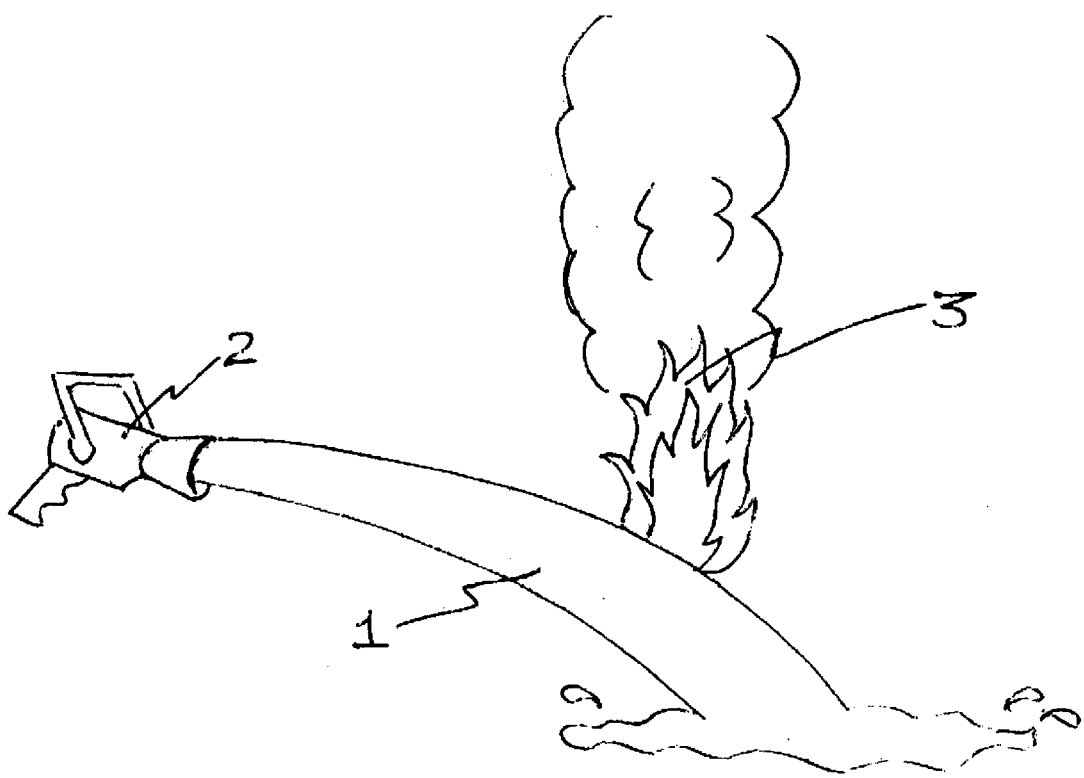
FIG. 1 is a diagram indicating a nozzle, extinguishing agent stream, and fire and smoke plume.

FIG. 1 represents the preferred embodiment of a real-time graphical simulation of an extinguishing agent 1 (e.g., water or foam) exiting a nozzle 2 in the vicinity of a fire and smoke plume 3. If the extinguishing agent, fire, and smoke plume are modeled as particle systems, each extinguishing agent, fire, or smoke particle will have a mass and a velocity associated with it. Using a scale factor based on distance, a force on the fire and smoke particles can be calculated from the speed and direction of extinguishing agent particles. To model the effect, an equation of the form (other actual forms are envisioned, but they will mainly show similar characteristics):

$$PV_{Out} = PV_{In} + \left(\frac{ExtAV - PV_{In}}{1+R}\right) * K$$

can be made, where:

$PV_{out}$ is the velocity (3-D vector) of the smoke and fire particles after the force is applied $PV_{in}$ is the velocity (3-D vector) of the smoke and fire particles before the force is applied ExtAV is the velocity (3-D vector) of extinguishing agent particles R is the radial distance between the smoke and fire particles and the extinguishing agent particles K is a factor that can be adjusted (from a nominal value of 1) for:
  Desired friction of the particle interactions
  The time in between simulation updates (will be referred to as Δt)
  Mass of the smoke, fire, and extinguishing agent particles
  Or other particular simulation characteristics where a value of 1 produces unrealistic results A force on the fire and smoke particles can be calculated based on the change in velocity:

$$F = \frac{(PV_{out} - PV_{in})(Mass)}{\Delta t}$$

where:

F is the actual force (3-D vector) to be applied to the smoke and fire particles Mass is the mass of the fire or smoke particles Δt is the time in between simulation updates Taking the above two equations, substituting and simplifying, the equation for the calculated force could be:

$$F = \frac{\left(\frac{ExtAV - PV_{In}}{1+R}\right) * K * Mass}{\Delta t}$$

Other versions of this equation are envisioned, but they are expected to be of a similar nature, with the same inputs as this equation.

The application of the calculated force simulates the visual effect of the extinguishing agent stream causing airflow that alters the motion of fire and smoke particles. Additionally, the calculations can be applied to smoke or other particles that are not part of a fire and smoke plume, such as extinguishing agent passing through ambient steam or ambient smoke particles in a room. The invention extends to other aerosols, gases, and particulate matter, such as dust, chemical smoke, and fumes.

Figure 2:
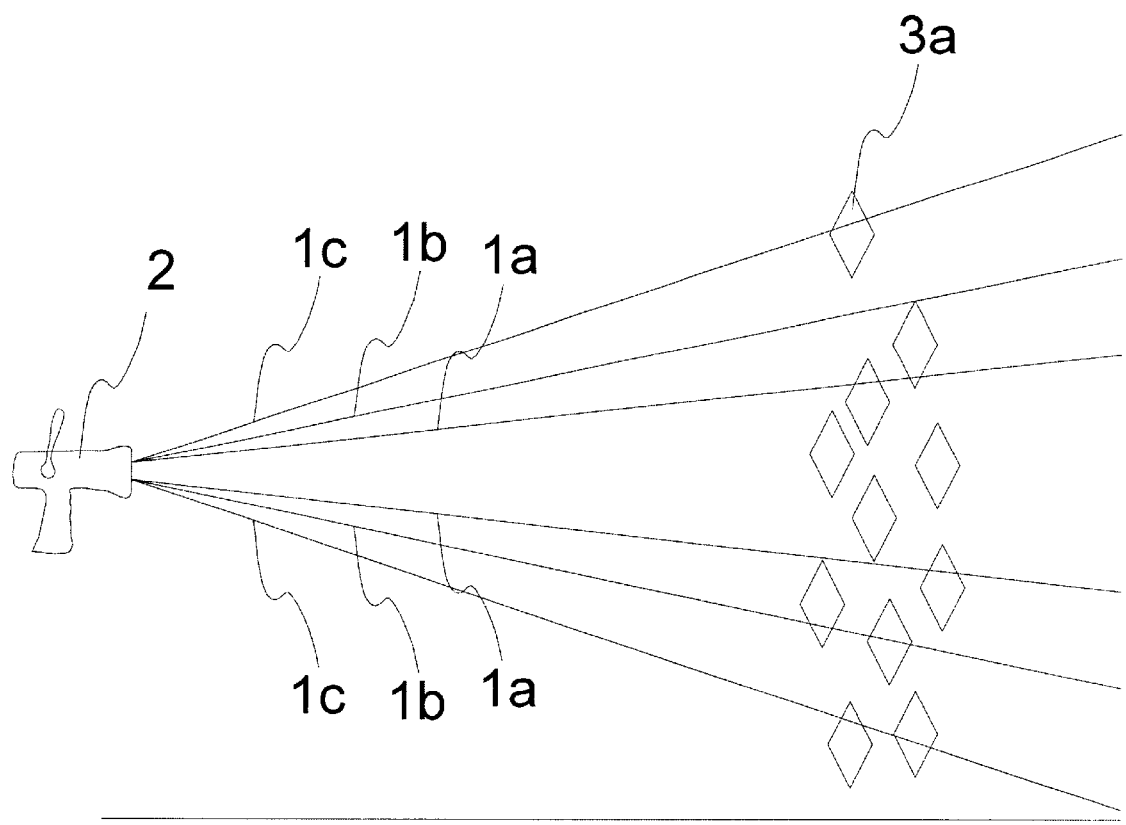
FIG. 2 is a diagram is a variant of FIG. 1 where the extinguishing agent stream is modeled to have multiple cone layers to represent multiple velocities in the profile of the stream.

As shown in FIG. 2, a side view of the preferred embodiment, a further refinement for determining a force to apply to particles in the fire and smoke plume 3 would entail modeling extinguishing agent 1 in cones 1a, 1b, and 1c (which are affected by gravity and will droop) from the nozzle 2, where the multiple additional concentric cones 1b and 1c to apply varying force. One embodiment that can produce the cones 1a, 1b, and 1c can be a system of rings (the system of rings may be modeled as a particle system) emitted from the nozzle, which, when connected, form cones 1a, 1b, and 1c. Those fire and smoke particles 3a which are contained mostly inside the inner cone 1a of the extinguishing agent 1 can have one level of force applied, and fire and smoke particles 3a which are not contained within cone 1a, but are contained within cones 1b or 1c can have a different, often smaller, force applied to them. Thus, multiple levels of velocity from extinguishing agent and air entrainment can be easily simulated to apply multiple levels of force to the fire and smoke. The additional cones 1b and 1c (or more if additional levels of force are desired) do not have to be drawn in the simulation, as they could be used strictly in determining the force to apply to the fire and smoke.

In the case of modeling the extinguishing agent as concentric cones outlined above, the force applied to a particle can be modeled as: (A) the extinguishing agent cone(s) 1a, 1b, 1c each having a velocity associated with them, (B) a difference in velocity between a particle 3a and the extinguishing agent cone(s) 1a, 1b, 1c can be calculated, (C) a force can be calculated that scales with that difference, and (D) the particles 3a will accelerate based on the force calculated, approaching the velocity of the extinguishing agent inside of the cone(s) 1a, 1b, 1c.

The results of the simulated effects described above can be observed by drawing particles as computer-generated graphics primitives using real-time graphics software and hardware. The invention is applicable to such areas as training simulations and computer games.

Although specific features of the invention are shown in the drawing and not others, this is for convenience only, as each feature may be combined with any or all of the other features in accordance with the invention.

Other embodiments will occur to those skilled in the art are within the following claims.

What is claimed is:

1. A method for producing a real-time computer graphics airflow simulation effect wherein a simulated stream of extinguishing agent from a nozzle affects the path of other simulation components comprising simulation particles emitted from a simulated fire, comprising:

producing a simulated fire having fire particles emitted from a base that travel along a path for a certain length through the simulation space before disappearing;

producing a simulated stream of extinguishing agent emitted from a virtual nozzle; and determining a simulated interaction of the extinguishing agent with the simulated fire particles whereby the particles that come in contact with the extinguishing agent stream have their paths altered, simulating the effects of forced airflow caused by the extinguishing agent stream.

2. The method of claim 1 in which the stream of extinguishing agent is in the shape of a cone.

3. The method of claim 2 in which the cone-shaped stream of extinguishing agent droops as it moves away from the virtual nozzle.

4. The method of claim 2 in which the cone-shaped stream of extinguishing agent can vary in angular width, length, and velocity of the stream.

5. The method of claim 2 in which producing the simulated stream comprises producing multiple layers of cones of the extinguishing agent stream.

6. The method of claim 5 in which each cone is used to simulate a different level of force to apply to simulation objects.

7. The method of claim 5 in which the multiple layers of the cone-shaped stream of extinguishing agent are concentric.

8. The method of claim 1 in which a particle system is used to simulate the extinguishing agent stream.

9. The method of claim 8 in which the force to apply to simulated fire particles is determined by the distance to the extinguishing agent stream, and the velocity of the extinguishing agent stream.

10. The method of claim 1 in which the results of the simulation effect are used to graphically simulate the effects of the extinguishing agent stream on the simulated fire particles.

11. A method for producing a real-time computer graphics airflow simulation effect wherein a simulated stream of extinguishing agent from a nozzle affects the path of other simulation components comprising simulation sub-components emitted from a simulated fire, comprising:

producing at least one simulation component in the simulation comprising sub-components each moving along a path;

producing a simulated stream of extinguishing agent emitted from a virtual nozzle;

determining a simulated interaction of the extinguishing agent with the sub-components, and whereby the sub-components that come in contact with the extinguishing agent stream have their paths altered, simulating the effects of forced airflow caused by the extinguishing agent stream.

12. The method of claim 11 in which the simulation component is selected from the group consisting of fire plumes, smoke plumes, ambient steam, ambient smoke, fumes, other aerosols, gases, and particulate matter.

13. The method of claim 11 in which the stream of extinguishing agent is in the shape of a cone.

14. The method of claim 13 in which the cone-shaped stream of extinguishing agent droops as it moves away from the virtual nozzle.

15. The method of claim 13 in which the cone-shaped stream of extinguishing agent can vary in angular width, length, and velocity of the stream.

16. The method of claim 13 in which producing the simulated stream comprises producing multiple layers of cones of the extinguishing agent stream.

17. The method of claim 16 in which each cone is used to simulate a different level of force to apply to simulation objects.

18. The method of claim 16 in which the multiple layers of the cone-shaped stream of extinguishing agent are concentric.

19. The method of claim 11 in which a particle system is used to simulate the extinguishing agent stream.

20. The method of claim 11 in which the sub-components comprise simulated fire particles of a particle system.

21. The method of claim 20 in which the force to apply to simulated fire particles is determined by the distance to the extinguishing agent stream, and the velocity of the extinguishing agent stream.

22. The method of claim 20 in which the results of the simulation effect are used to graphically simulate the effects of the extinguishing agent stream on the simulated fire particles.

* * * * *